A. F. WIKING.
MEANS FOR ADJUSTING AND SHORING SHIPS IN DRY SETTING.
APPLICATION FILED DEC. 29, 1914.
1,235,089.
Patented July 31, 1917.
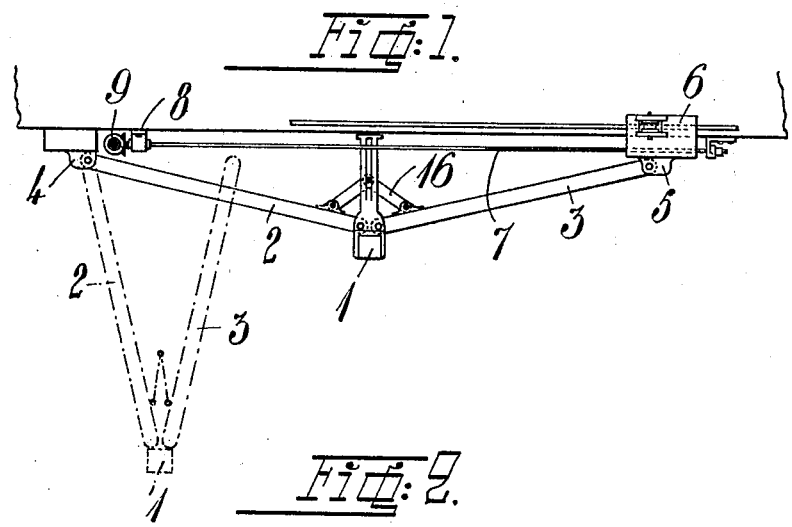
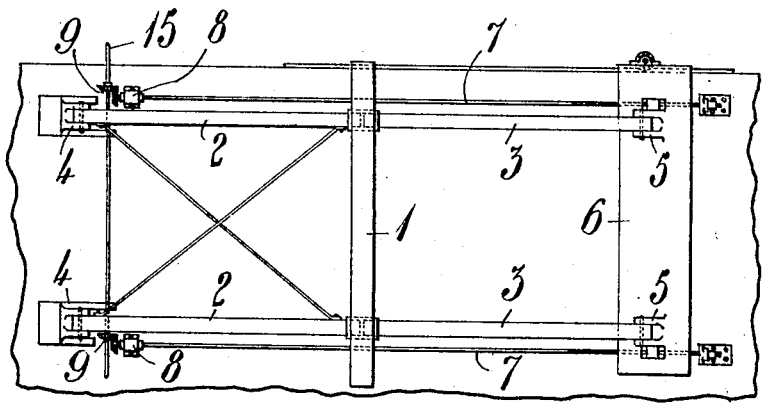
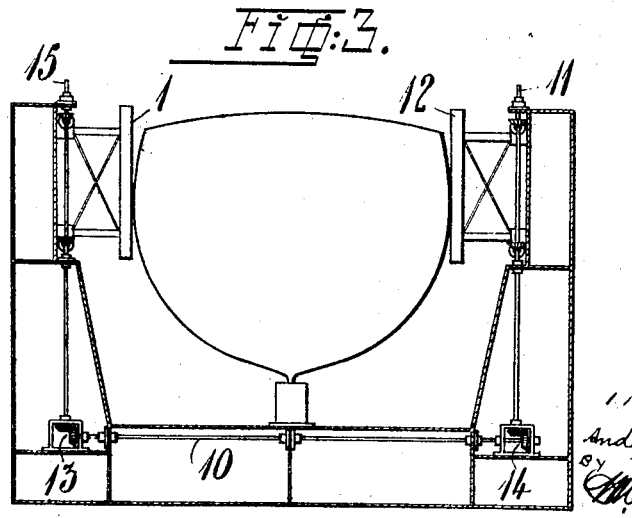

UNITED STATES PATENT OFFICE.

ANDERS FREDRIK WIKING, OF STOCKHOLM, SWEDEN.

MEANS FOR ADJUSTING AND SHORING SHIPS IN DRY SETTING.

1,235,089.  Specification of Letters Patent.  Patented July 31, 1917.

Application filed December 29, 1914. Serial No. 879,439.

*To all whom it may concern:*

Be it known that I, ANDERS FREDRIK WIKING, a subject of the King of Sweden, residing at 141 Folkungagatan, Stockholm, Sweden, have invented new and useful Improvements in Means for Adjusting and Shoring Ships in Dry Setting, of which the following is a specification.

Adjusting and shoring ships in dry setting is a comparatively time-wasting operation and further not free from danger, especially when the docking takes place in turbulent weather or agitated sea. The present invention relates to an apparatus for quickly and safely accomplishing this difficult operation.

The apparatus in question is illustrated in the accompanying drawing in a plan view in Figure 1 and in a side view in Fig. 2 while Fig. 3 shows the same applied to a two sided floating dock. The arrangement, however, can be applied to any two sided dock or slip.

The apparatus is substantially so arranged that the ship hauled into the dock is surrounded on both sides by one or more vertical beams which are moved simultaneously two and two with the same speed toward the center of the dock, so that the ship, when being secured between the said pairs of beams, will be shored with its keel right over the center of the dock, and thus the purposes of the apparatus will be accomplished quickly simultaneously and efficiently. The simultaneous motion of the beams of each pair with the same speed is accomplished in the following manner:

Each beam (for instance the beam 1, Figs. 1, 2) is acted upon by for instance four shores or braces 2, 3, the outer ends of which bear against the beam, while the inner ends of the shores 2 lie in bearings 4 secured to the dock side of the inner ends of the shores 3 in bearings 5 on a carriage 6 movable along the dock side which here is shown as plane.

When the carriage 6 is moved toward or away from the fixed bearings 4, a movement toward or away from the center line of the dock is communicated to the beam by the shores 3. The dash and dotted lines in Fig. 1 designate the position of the beam and shores in the former case. The moving of the carriage is effected by means of ropes, screws or in other manner. In the drawing an arrangement with screws of the following nature is shown. In collar thrust bearings 8 secured to the dock side the one end of two screws 7 is supported, the nuts of which are secured to the carriage 6. The screws are rotated simultaneously and with the same speed in either direction by means of bevel gears 9 from a shaft 15, the carriage 6 being thereby moved and the beam 1, still in vertical position, moved toward or away from the center line of the dock.

If the shaft 15 is brought into connection with a vertical shaft 11 on the other side of the dock by means of a bevel gearing 13, an intermediary shaft 10 and a second gearing 14, as shown in Fig. 3, the two shafts 15 and 11 can be rotated simultaneously. This latter shaft 11 may be provided with bevel gears, screws, a carriage, shores and a beam 12 in the same manner as the shaft 15 at the other side of the dock, the beam 12 then being moved quite uniformly with the beam 1 toward or away from the center line of the dock by the rotation of the shaft 15. 16 are arms in parallelograms which prevent the rotation of the beam 1 around its own axis when moving.

The effect of the uniform movements of said beams 1 and 12 toward the center line of the dock is illustrated in Fig. 3 by means of a ship which has been placed with its keel right over the center line of the keel blocks and further efficiently supported laterally by the vertical beams 1 and 12. Of course this squeezing of the ship between the vertical beams should be effected before the keel and block come into contact with each other, and only after the ship has thus been centered between the walls of the dock the keel and keel block should be brought together and the docking be accomplished without interruption.

Having now particularly described the nature of my invention and the manner of its operation, what I claim is:

1. In a dry dock, vertical shoring beams, braces pivotally attached thereto, certain of said braces being pivotally attached to the walls of the dock, carriages slidable parallel to the wall of the dock to which the other braces are pivotally attached, and means for sliding said carriages whereby the shoring beams may be moved toward or away from the center of the dock.

2. In a dry dock, vertical shoring beams arranged on both sides of the dock, braces pivotally attached to said beams, certain of said braces being pivotally attached to the walls of the dock, slidable carriages to which the other braces are pivotally attached, and means for simultaneously sliding said carriages thereby moving the beams uniformly toward the center of the dock to center and shore the ship.

3. In a dry dock, vertical shoring beams arranged on both sides of the dock, braces pivotally attached to said beams, certain of said braces being pivotally attached to the walls of the dock, slidable carriages to which the other braces are pivotally attached, screws to impart sliding motion to said carriages, and interconnecting shafts and gears adapted to rotate said screws simultaneously whereby the centering and shoring of the ship is effected in a single operation.

In testimony whereof I have signed my name to this specification in the presence of two subscribing witnesses.

ANDERS FREDRIK WIKING.

Witnesses:
BIRGER NORDFELDT,
ADA SIMON.

Copies of this patent may be obtained for five cents each, by addressing the "Commissioner of Patents, Washington, D. C."